(12) United States Patent
Saburi et al.

(10) Patent No.: US 12,206,209 B2
(45) Date of Patent: Jan. 21, 2025

(54) CONNECTOR (71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Chikara Saburi, Mie (JP); Yuka Koizumi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 351 days.

(21) Appl. No.: 17/798,534

(22) PCT Filed: Jan. 29, 2021

(86) PCT No.: PCT/JP2021/003141
§ 371 (c)(1),
(2) Date: Aug. 9, 2022

(87) PCT Pub. No.: WO2021/166585
PCT Pub. Date: Aug. 26, 2021

(65) Prior Publication Data
US 2023/0125355 A1  Apr. 27, 2023

(30) Foreign Application Priority Data
Feb. 19, 2020  (JP) .................. 2020-026024

(51) Int. Cl.
H01R 13/00    (2006.01)
H01R 13/422   (2006.01)
(Continued)

(52) U.S. Cl.
CPC ....... *H01R 13/6473* (2013.01); *H01R 13/422* (2013.01); *H01R 31/08* (2013.01)

(58) Field of Classification Search
CPC ... H01R 13/6473; H01R 13/422; H01R 31/08
See application file for complete search history.

(56) References Cited

U.S. PATENT DOCUMENTS 6,186,806 B1      2/2001  Suzuki et al.
12,002,795 B2 *   6/2024  Gan ............... H05K 3/368
(Continued)

FOREIGN PATENT DOCUMENTS

JP    2004-158384 A    6/2004
JP    2005-123100 A    5/2005
(Continued)

OTHER PUBLICATIONS

Inlemalional Search Report issued on Apr. 13, 2021 for WO 2021/166585 A1 (6 pages).

*Primary Examiner* — Phuong Chi Thi Nguyen
(74) *Attorney, Agent, or Firm* — Venjuris, P.C.

(57) ABSTRACT

A connector is provided with a housing including terminal accommodation chambers arranged in two rows, two shorting members to be mounted into a plurality of the terminal accommodation chambers arranged in one row and a plurality of the terminal accommodation chambers arranged in the other row and constituting a differential pair, a plurality of terminal fittings to be individually fixed to a main line constituting a differential pair and a branch line constituting a differential pair and connected to the shorting members by being inserted into the terminal accommodation chambers, and a plurality of locking lances formed in the housing and configured to retain the terminal fittings inserted into the terminal accommodation chambers. The locking lances are disposed only in regions different from a region between the plurality of terminal accommodation chambers arranged in (Continued)

the one row and the plurality of terminal accommodation chambers arranged in the other row.

7 Claims, 8 Drawing Sheets

(51) Int. Cl.
  *H01R 13/6473* (2011.01)
  *H01R 31/08* (2006.01)

(56) References Cited

U.S. PATENT DOCUMENTS

| | | | |
|---|---|---|---|
| 2004/0183193 A1* | 9/2004 | Koide | H01L 23/50 |
| | | | 257/E23.079 |
| 2005/0014396 A1* | 1/2005 | Harper, Jr. | H01R 12/52 |
| | | | 439/66 |
| 2015/0243609 A1* | 8/2015 | Lamorey | H01L 25/165 |
| | | | 361/717 |
| 2021/0281032 A1 | 9/2021 | Miyamura et al. | |

FOREIGN PATENT DOCUMENTS

| | | |
|---|---|---|
| JP | 2007-012352 A | 1/2007 |
| JP | 2007-110195 A | 4/2007 |
| JP | 2016-122588 A | 7/2016 |
| JP | 2016-134216 A | 7/2016 |

* cited by examiner

CONNECTOR

CROSS REFERENCE TO RELATED APPLICATIONS

This application is a national phase of PCT application No. PCT/JP2021/003141, filed on 29 Jan. 2021, which claims priority from Japanese patent application No. 2020-026024, filed on 19 Feb. 2020, all of which are incorporated herein by reference.

TECHNICAL FIELD

The present disclosure relates to a connector.

BACKGROUND

Patent Document 1 discloses a structure for branching a transmission line of a communication circuit installed in a vehicle by a signal branching device. The signal branching device is provided with a pair of E-shaped metal pieces each having three male terminals, female terminals are connected to end parts of two pairs of cables constituting a main line of the communication circuit, and female terminals are connected also to a pair of cables constituting a branch line branched from the main line. By connecting the female terminals to the male terminals of the pair of metal pieces, the branch line is branched from the main line.

PRIOR ART DOCUMENT

Patent Document

Patent Document 1: JP 2007-110195 A

SUMMARY OF THE INVENTION

Problems to be Solved

The male terminal and the female terminal are held in a connected state only by friction resistance between the both terminals. As a method for reliably connecting the both terminals, a locking lance for retaining the male terminal can be provided. If locking lances are arranged between two metal pieces when the metal pieces constitute a differential pair, an interval of the differential pair increases. Thus, there is a concern that a degree of freedom is reduced in setting impedance and the impedance cannot be matched.

A connector of the present disclosure was completed on the basis of the above situation and aims to match impedance.

Means to Solve the Problem

The present disclosure is directed to a connector with a housing including terminal accommodation chambers arranged in two rows, two shorting members to be mounted into a plurality of the terminal accommodation chambers arranged in one row and a plurality of the terminal accommodation chambers arranged in the other row, the two shorting members constituting a differential pair, a plurality of terminal fittings to be individually fixed to a main line constituting a differential pair and a branch line constituting a differential pair, the plurality of terminal fittings being connected to the shorting members by being inserted into the terminal accommodation chambers, and a plurality of locking lances formed in the housing, the plurality of locking lances retaining the terminal fittings inserted into the terminal accommodation chambers, the locking lances being disposed only in regions different from a region between the plurality of terminal accommodation chambers arranged in the one row and the plurality of terminal accommodation chambers arranged in the other row.

Effect of the Invention

According to the present disclosure, it is possible to match impedance.

DETAILED DESCRIPTION TO EXECUTE THE INVENTION

Description of Embodiments of Present Disclosure

First, embodiments of the present disclosure are listed and described.

(1) The connector of the present disclosure is provided with a housing including a plurality of terminal accommodation chambers arranged in two rows, two shorting members to be mounted into a plurality of the terminal accommodation chambers arranged in one row and a plurality of the terminal accommodation chambers arranged in the other row, the two shorting members constituting a differential pair, a plurality of terminal fittings to be individually fixed to a main line constituting a differential pair and a branch line constituting a differential pair, the plurality of terminal fittings being connected to the shorting members by being inserted into the terminal accommodation chambers, and a plurality of locking lances formed in the housing, the plurality of locking lances retaining the terminal fittings inserted into the terminal accommodation chambers, the locking lances being disposed only in regions different from a region between the plurality of terminal accommodation chambers arranged in the one row and the plurality of terminal accommodation chambers arranged in the other row.

According to the configuration of the present disclosure, a circuit composed of the shorting member and the terminal fittings accommodated in the plurality of terminal accommodation chambers arranged in the one row and a circuit composed of the shorting member and the terminal fittings accommodated in the plurality of terminal accommodation chambers arranged in the other row constitute the differential pair. Since no locking lance is arranged between the plurality of terminal accommodation chambers arranged in the one row and the plurality of terminal accommodation chambers arranged in the other row, an interval of the differential pair in the housing can be sufficiently narrowed. Since a degree of freedom in design in setting the interval of the differential pair in the housing is enhanced, impedance in the housing and impedance of the main line and the branch line outside the housing can be matched with high accuracy.

(2) Preferably, a plurality of the terminal accommodation chambers and a plurality of the locking lances are alternately arranged in each row of the terminal accommodation chambers. According to this configuration, since spaces for forming the locking lances are contained in the row of the terminal accommodation chambers, the housing can be reduced in size in an arrangement direction of the shorting members.

(3) Preferably, in (2), connection ports communicating with the terminal accommodation chambers and operation ports enabling the locking lances to be disengaged from the terminal fittings are alternately open in a front surface of the housing, the shorting member includes a plurality of connecting portions to be connected to the terminal fittings by being inserted into the terminal accommodation chambers through the connection ports and a coupling portion coupling the plurality of connecting portions to each other, and the coupling portion is arranged at a position different from the operation ports in a front view of the housing. According to this configuration, even if the connection ports of the terminal accommodation chambers and the operation ports for the locking lances are arranged in a row, the coupling portion does not obstruct an operation when the jig is inserted into the operation port to displace the locking lance.

(4) Preferably, in (3), the shorting member is formed with reinforcing portions in the form of ribs projecting from the coupling portion by extending the connecting portions. According to this configuration, the deformation of the connecting portions can be prevented by the reinforcing portions.

(5) Preferably, in (3) or (4), the coupling portions of the two shorting members are arranged to sandwich the terminal accommodation chambers in a front view. According to this configuration, since no coupling portion is arranged between the terminal accommodation chambers in the one row and the terminal accommodation chambers in the other row, the interval of the differential pair in the housing can be sufficiently narrowed. Since a degree of freedom in design in setting an interval of branch circuits constituting the differential pair in the housing is enhanced, the impedance in the housing and the impedance of the main line and the branch line outside the housing can be matched with high accuracy.

(6) Preferably, a distance between the terminal fittings inserted into the terminal accommodation chambers arranged in the one row and the terminal fittings inserted into the terminal accommodation chambers arranged in the other row is 2.1 mm to 2.3 mm. According to this configuration, the impedance in the housing and the impedance of the main line and the branch line outside the housing can be matched with high accuracy.

(7) Preferably, in (6), the distance between the terminal fittings inserted into the terminal accommodation chambers arranged in the one row and the terminal fittings inserted into the terminal accommodation chambers arranged in the other row is 2.2 mm. According to this configuration, the impedance in the housing and the impedance of the main line and the branch line outside the housing can be matched with high accuracy.

Details of Embodiments of Present Disclosure

First Embodiment

A first specific embodiment of a connector A of the present disclosure is described with reference to FIGS. 1 to 7. Note that the present invention is not limited to these illustrations and is intended to be represented by claims and include all changes in the scope of claims and in the meaning and scope of equivalents. In the first embodiment, an oblique left lower side in FIGS. 1 and 2 and a left side in FIG. 3 are defined as a front side concerning a front-rear direction. Upper and lower sides shown in FIGS. 1 to 6 are directly defined as upper and lower sides concerning a vertical direction. Left and right sides shown in FIGS. 1, 2 and 4 to 6 are directly defined as left and right sides concerning a lateral direction.

Figure 7:
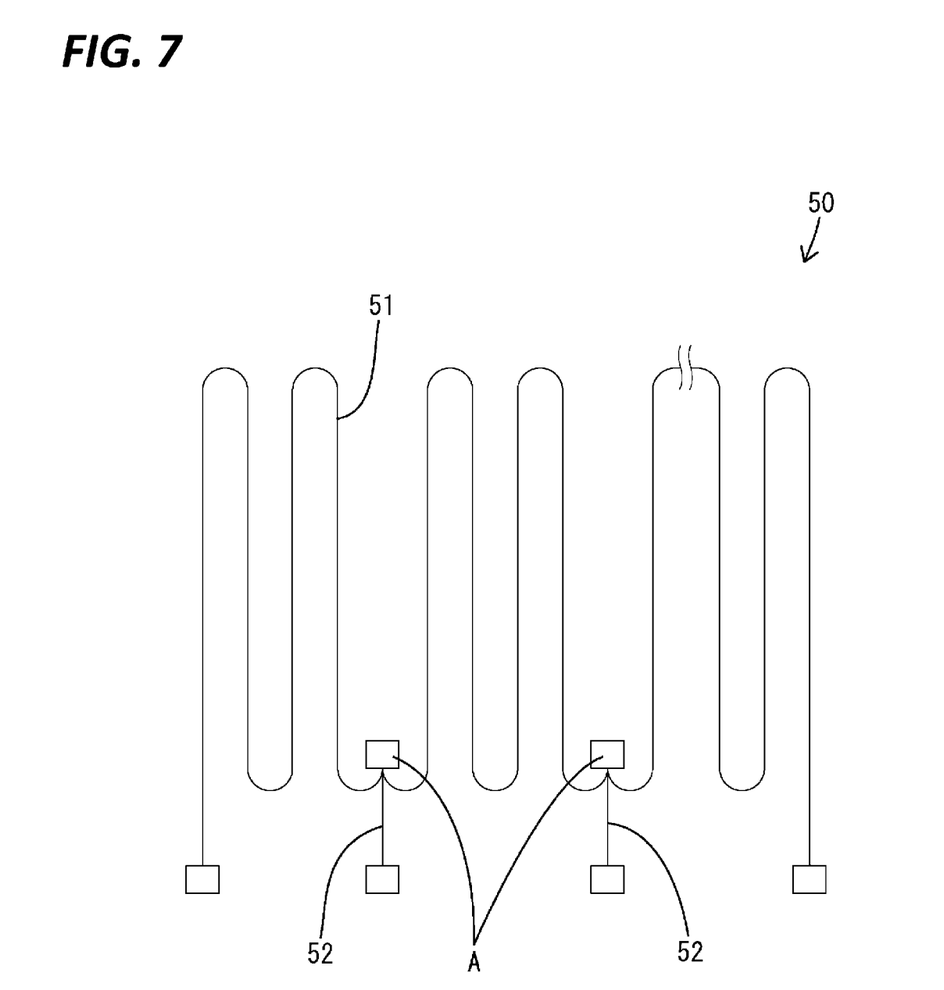
FIG. 7 is a wiring diagram of a high-speed communication circuit branched by multi-drop connection.

The connector A of this embodiment is used for a high-speed communication circuit 50 to be installed in a vehicle. As shown in FIG. 7, the high-speed communication circuit 50 includes a main line 51 and a plurality of branch lines 52 branched at a plurality of positions of the main line 51 by multi-drop connection. The connector A of this embodiment is used as a connection device for branching the branch line 52 from the main line 51. Any of the main line 51 and the branch lines 52 is constituted by a differential pair cable. The main line 51 includes a plurality of connecting end parts 51E by being cut at the plurality of positions where the branch lines 52 are branched. The connecting end parts 51E of the main line 51 and base end parts 52E of the branch line 52 are connected via the connector A.

Figure 1:
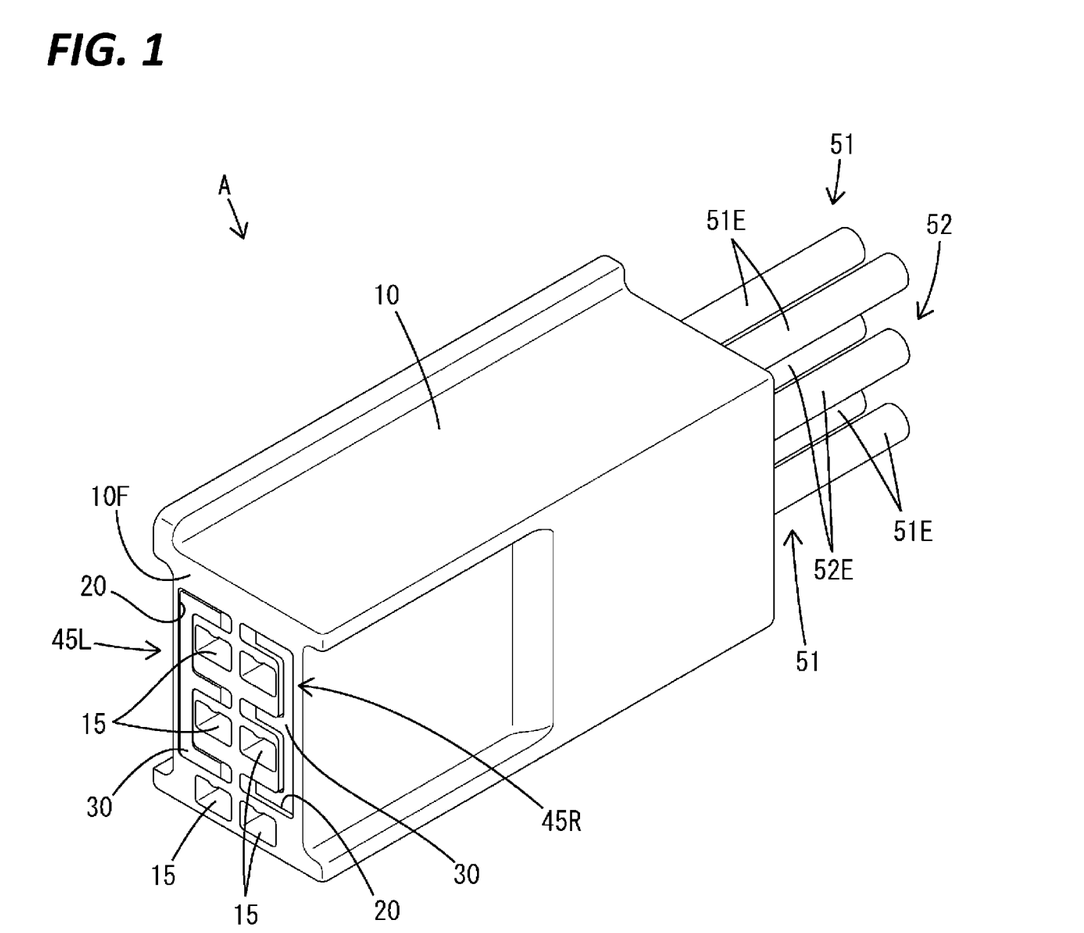
FIG. 1 is a perspective view of a connector according to a first embodiment.
Figure 2:
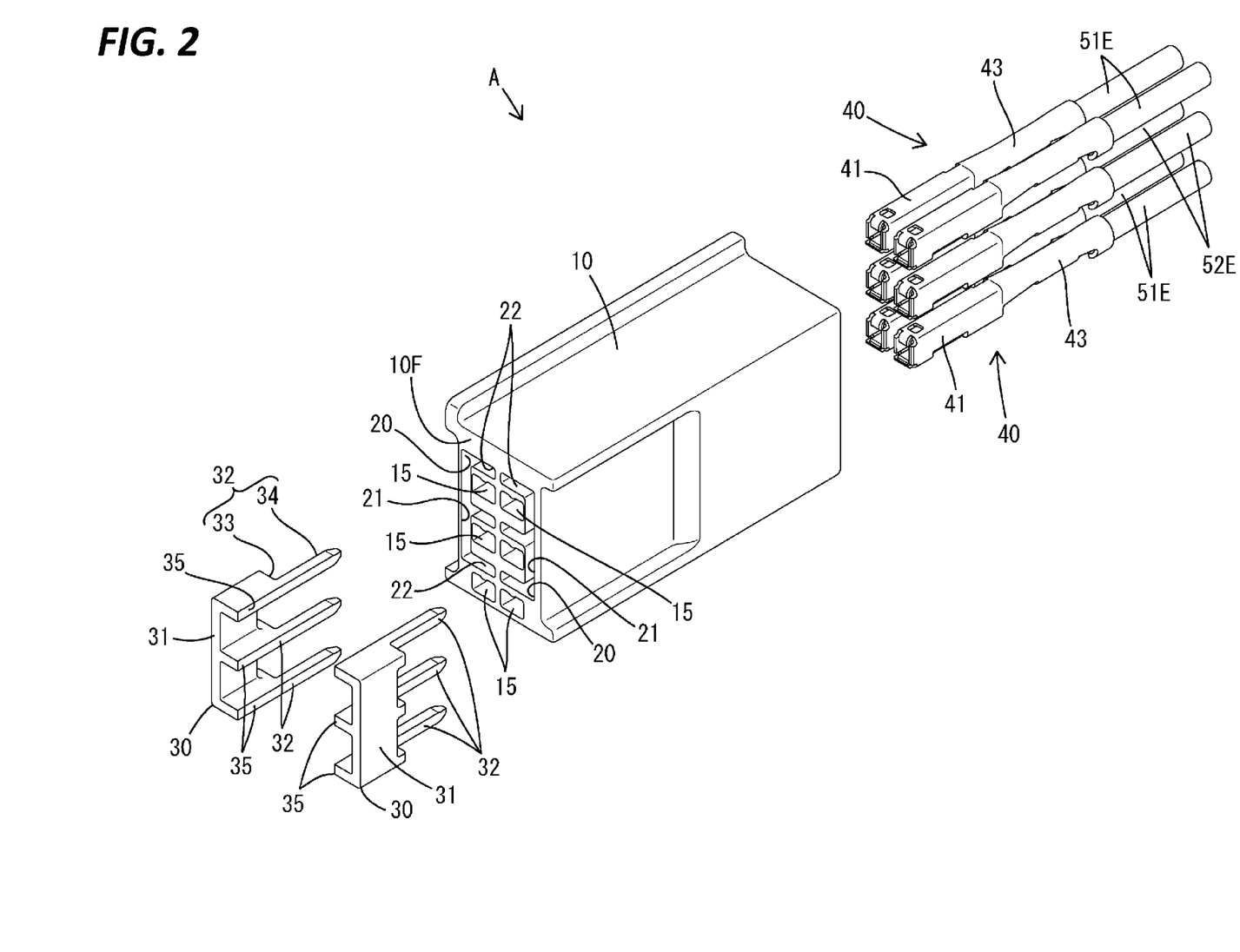
FIG. 2 is an exploded perspective view of the connector.
Figure 3:
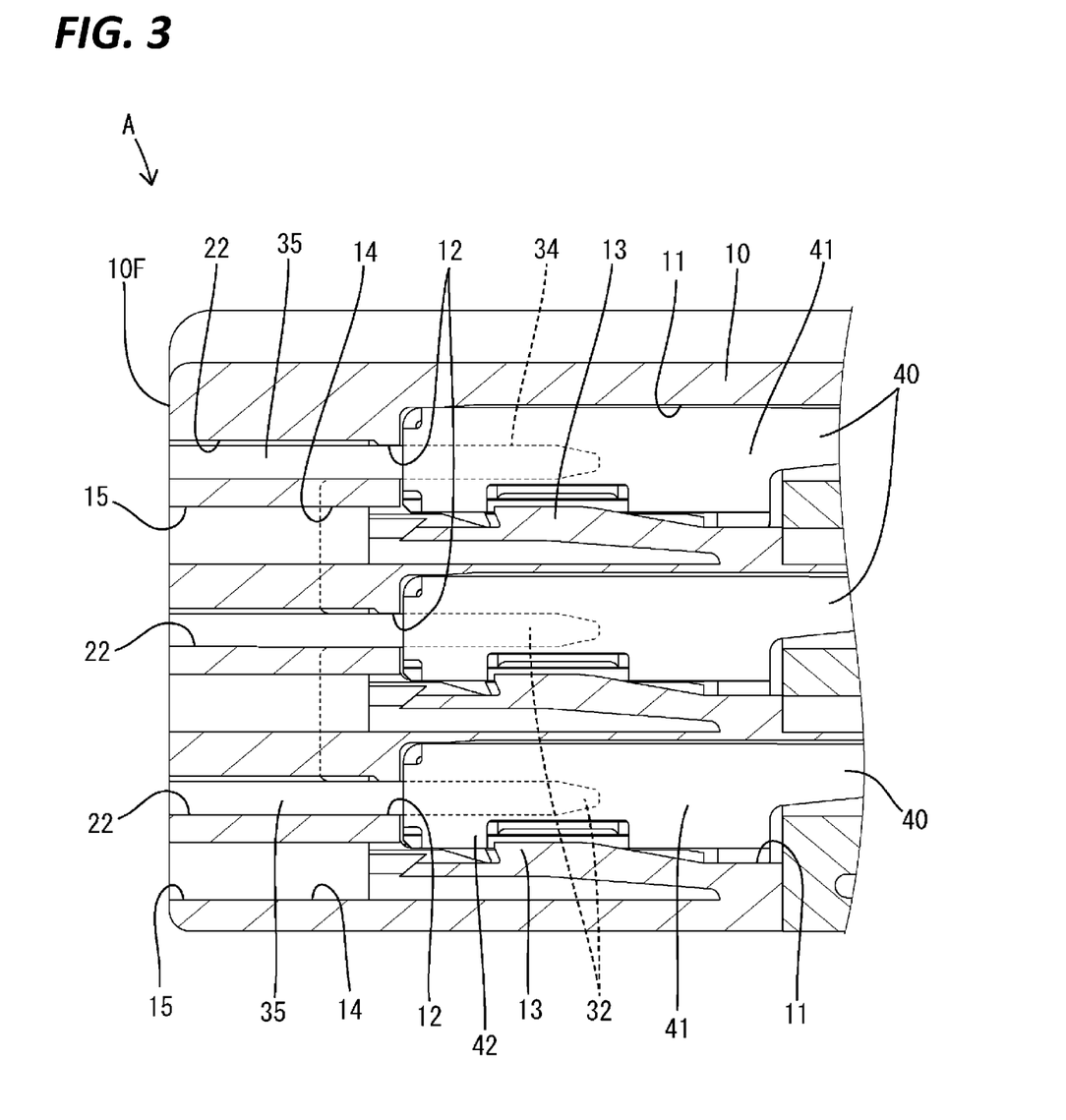
FIG. 3 is a partial enlarged side view in section of the connector.
Figure 4:
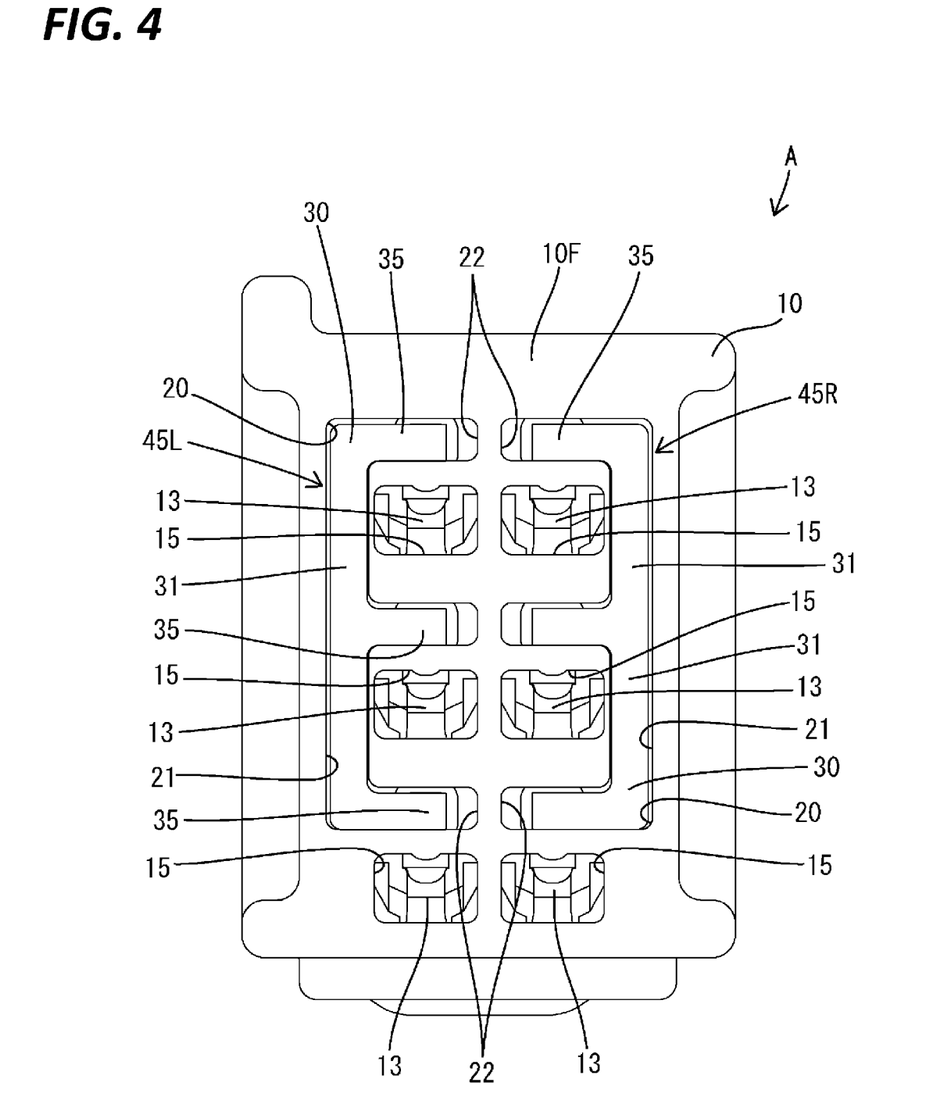
FIG. 4 is a front view of the connector.
Figure 5:
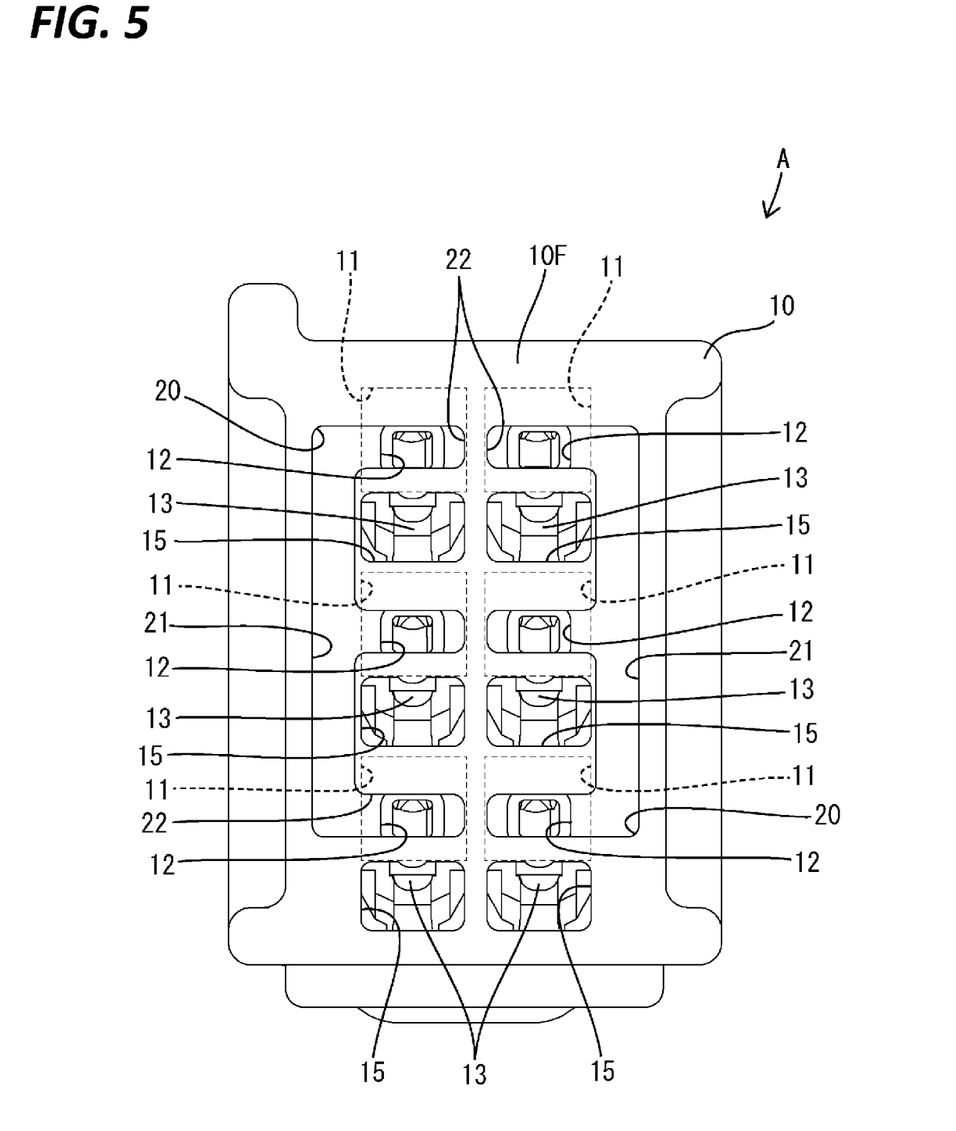
FIG. 5 is a front view showing a state where shorting members are removed from a housing.
Figure 6:
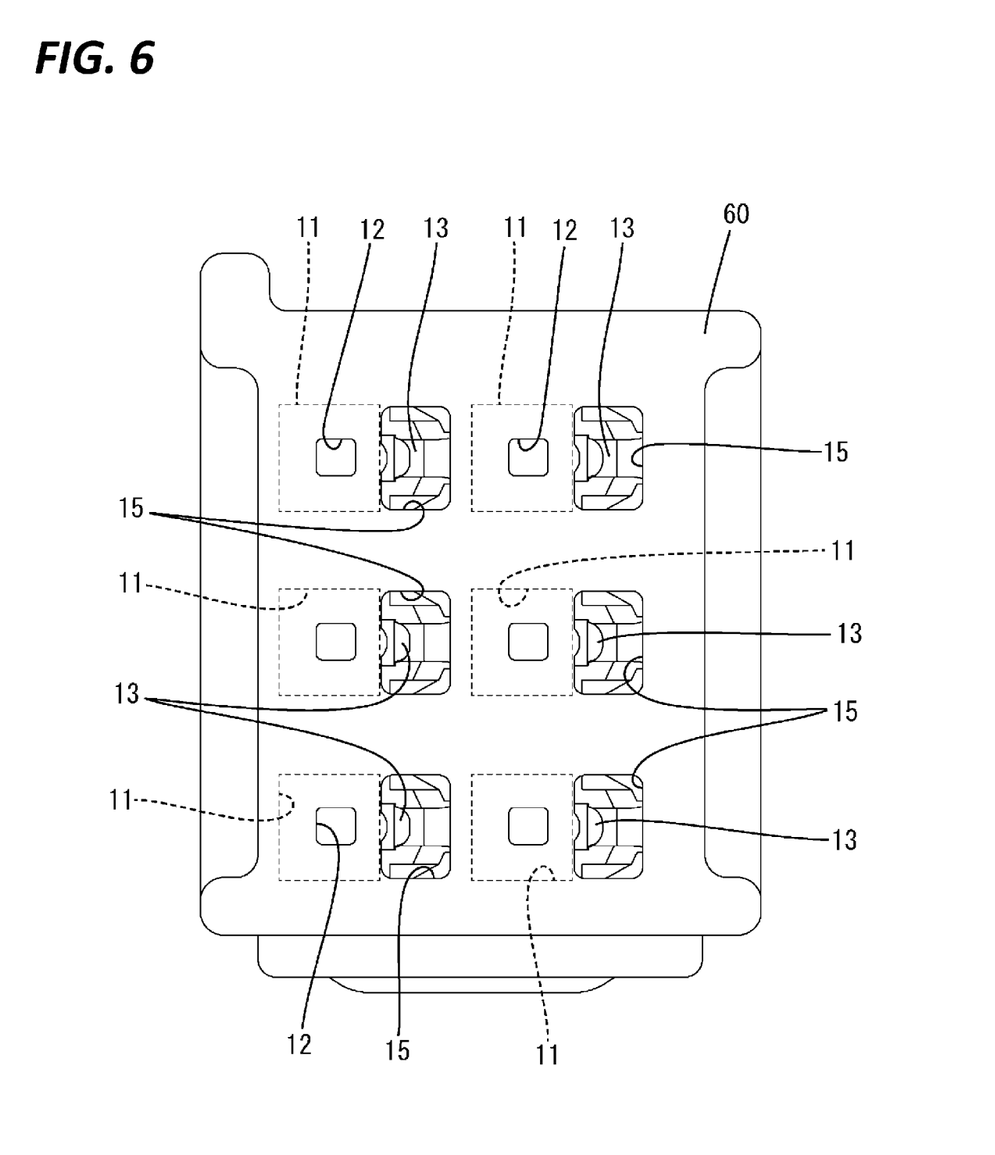
FIG. 6 is a front view showing the arrangement of connection ports and operation ports in a housing of a comparative example.

As shown in FIG. 2, the connector A includes one housing 10, a pair of shorting members 30 and a plurality of (three pairs of) terminal fittings 40. As shown in FIG. 3, three pairs of terminal accommodation chambers 11 penetrating through the housing 10 in the front-rear direction are formed in the housing 10. As shown in FIG. 5, the three pairs of terminal accommodation chambers 11 are separately arranged in two left and right rows, and three terminal accommodation chambers 11 are arranged in the vertical direction in each of the left and right row. The front ends of the terminal accommodation chambers 11 are open as connection ports 12 in a front surface 10F of the housing 10.

As shown in FIG. 3, the housing 10 is formed with locking lances 13 for retaining the terminal fittings 40 inserted into the terminal accommodation chambers 11. The locking lance 13 is cantilevered forward along the lower surface of the terminal accommodation chamber 11 and can be resiliently displaced in the vertical direction. The housing 10 has mold removal spaces 14 formed when the locking lances 13 are molded. The mold removal spaces 14 are disposed in front of the locking lances 13. The front ends of the mold removal spaces 14 are open as operation ports 15 in the front surface 10F of the housing 10.

As shown in FIG. 5, three connection ports 12 and three operation ports 15 are alternately arranged in a row in the vertical direction in a left region of the front surface 10F of the housing 10. Three connection ports 12 and three operation ports 15 are alternately arranged in a row in the vertical direction also in a right region of the front surface 10F of the housing 10. The connection port 12 is disposed at the uppermost end of each row, and the operation port 15 is disposed at the lowermost end of each row. A width of the operation port 15 is larger than that of the connection port 12. In a front view of the housing 10, the connection port 12 is arranged in the entire width range of the operation port 15.

A pair of bilaterally symmetrical accommodation recesses 20 for individually accommodating the two shorting members 30 are formed in the front surface 10F of the housing 10. The accommodation recess 20 includes one communication recess 21 in the form of a slit elongated in the vertical direction and three branch recesses 22 in the form of slits elongated in the lateral direction. The communication recess 21 and the three branch recesses 22 communicate. The accommodation recess 20 is a space for accommodating the shorting member 30 mounted into the housing 10.

The communication recess 21 is elongated in a direction parallel to an arrangement direction of the terminal accommodation chambers 11 in each of the left and right rows and an arrangement direction of the connection ports 12 and the operation ports 15 in each of the left and right rows. Two communication recesses 21 laterally spaced apart are arranged to sandwich the connection ports 12 and the operation ports 15 from both left and right sides. In other words, the communication recesses 22 are arranged in regions elongated in the vertical direction between the connection ports 12 and the operation ports 15 and both left and right side edges of the housing 10. A formation range of the communication recess 21 in the vertical direction is a range from the same height as the uppermost connection port 12 to the same height as the lowermost connection port 12.

The three branch recesses 22 extend from the communication recess 21 to be branched in the lateral direction toward an arrangement region of the connection ports 12 and the operation ports 15. The three branch recesses 22 are arranged at the same heights as three connection ports 12 arranged in the vertical direction. An extending end of each branch recess 22 communicates with the connection port 12. That is, the connection port 12 is open to the extending end of the branch recess 22.

The shorting member 30 is a single component made of an electrically conductive material such as metal. As shown in FIG. 2, the shorting member 30 includes one coupling portion 31, three connecting portions 32 and three reinforcing portions 35. The coupling portion 31 is in the form of a flat plate having a plate thickness direction oriented in the lateral direction. The coupling portion 31 has a vertically long rectangular shape in a side view of the housing 10. A vertical dimension (height) of the coupling portion 31 is equal to a vertical dimension of the communication recess 21 of the housing 10. A lateral dimension (thickness) of the coupling portion 31 is equal to a lateral dimension (width) of the communication recess 21.

The three connecting portions 32 are connected to the rear end edge of the coupling portion 31 at three positions, i.e. an uppermost end part, a lowermost end part and a vertically central part. The three connecting portions 32 arranged vertically in parallel are electrically conductively coupled to each other via the coupling portion 31. The connecting portion 32 includes a separation linking portion 33 projecting in the lateral direction (plate thickness direction of the coupling portion 31) from the rear end edge of the coupling portion 31 and a connection function portion 34 cantilevered rearward from the projecting end of the separation linking portion 33.

A vertical dimension of the separation linking portion 33 is equal to that of the branch recess 22. A projecting dimension in the lateral direction of the separation linking portion 33 is equal to a length in the lateral direction of the branch recess 22. A vertical direction of the connection function portion 34 is equal to that of the connection port 12. A lateral dimension of the connection function portion 34 is equal to that of the connection port 12.

In a front view, the coupling portion 31 and three connection function portions 34 arranged in parallel in the vertical direction are arranged at such positions as to be separated in the lateral direction. The shorting member 30 to be mounted into the left accommodation recess 20 is shaped such that the coupling portion 31 is arranged to the left of the connection function portions 34. The shorting member 30 to be mounted into the right accommodation recess 20 is shaped such that the coupling portion 31 is arranged to the right of the connection function portions 34.

The three reinforcing portions 35 are connected to the coupling portion 31 and individually connected to the three connecting portions 32. The reinforcing portion 35 is in the form of a flat plate having a plate thickness direction oriented in the vertical direction. In a plan view of the housing 10, the reinforcing portion 35 has a rectangular shape long in the front-rear direction. The three reinforcing portions 35 are cantilevered in the lateral direction from a side surface of the coupling portion 31 at three positions, i.e. an uppermost end, a lowermost end and a vertically central part. A formation range in the front-rear direction of the reinforcing portion 35 is a region from the front end to the rear end of the coupling portion 31.

A rear end edge part of the reinforcing portion 35 is connected to a front edge part of the separation linking portion 33 of the connecting portion 32. The reinforcing portion 35 and the separation linking portion 33 are integrated and the connection function portion 34 extends from the rear end edge of the reinforcing portion 35. In other words, the reinforcing portion 35 in the form of a rib projecting from the coupling portion 31 is located on a forward extension of the connection function portion 34. Since the connection function portion 34 and the reinforcing portion 35 are connected in the front-rear direction, a front end part of the connection function portion 34 is reinforced.

The shorting member 30 is mounted in the housing 10 while being accommodated in the accommodation recess 20. With the shorting member 30 mounted in the housing 10, the coupling portion 31 is accommodated in the communication recess 21, the separation linking portions 33 are accommodated in back end parts of the branch recesses 22 and the connection function portions 34 are accommodated in the terminal accommodation chambers 11 through the connection ports 12. Opening regions of the operation ports 15 in the front surface 10F of the housing 10 are open over entire surfaces.

As shown in FIG. 2, the terminal fitting 40 has a shape elongated in the front-rear direction as a whole. A terminal body portion 41 in the form of a rectangular tube is formed in a front end part of the terminal fitting 40, and a crimping portion 43 in the form of an open barrel is formed in a rear end part of the terminal fitting 40. A resilient contact portion (not shown), which can resiliently contact the connection function portion 34, is accommodated in the terminal body portion 41. As shown in FIG. 3, a locking portion 42 to be locked to the locking lance 13 is formed on the lower surface of the terminal body portion 41. The crimping portion 43 is electrically conductively fixed to the connecting end part 51E of the main line 51 or the base end part 52E of the branch line 52.

The terminal fitting 40 is accommodated into the terminal accommodation chamber 11 from behind the housing 10. Out of the three pairs of terminal accommodation chambers 11 separately arranged in two rows, the terminal fittings 40 fixed to the connecting end parts 51E of the main line 51 are inserted into two terminal accommodation chambers 11 on the uppermost end and two terminal accommodation chambers 11 on the lowermost end. The two terminal fittings 40 inserted into the terminal accommodation chambers 11 on the uppermost end are fixed to the connecting end parts 51E constituting the differential pair cable. The two terminal fittings 40 inserted into the terminal accommodation chambers 11 on the lowermost end are also fixed to the connecting end parts 51E constituting the differential pair cable. The two terminal fittings 40 connected to the base end parts 52E of the branch line 52 are inserted into two terminal accommodation chambers 11 at an intermediate height. The two terminal fittings 40 inserted into the terminal accommodation chambers 11 at the intermediate height are fixed to the base end parts 52E of the branch line 52 constituting the differential pair cable.

The terminal fittings 40 accommodated into the terminal accommodation chambers 11 are retained and held by locking the locking portions 42 to the locking lances 13. With the terminal fittings 40 inserted in the terminal accommodation chambers 11, the three connection function portions 34 of each shorting member 30 individually enter three terminal body portions 41 arranged in the vertical direction and contact the resilient contact portions. In this way, one branch circuit 45L (see FIGS. 1 and 4) is constituted by three terminal fittings 40 inserted into the three terminal accommodation chambers 11 arranged on the left side and the shorting member 30 for electrically conducting these three terminal fittings 40 to each other. Another branch circuit 45R (see FIGS. 1 and 4) is constituted by three terminal fittings 40 inserted into the three terminal accommodation chambers 11 arranged on the right side and the shorting member 30 for electrically conducting these three terminal fittings 40 to each other. The left and right branch circuits 45L, 45R configured inside the housing 10 constitute a differential pair.

In a front view, no locking lance 13 is present between the row of the terminal accommodation chambers 11 on the left side and the row of the terminal accommodation chambers 11 on the right side. Accordingly, the narrowing of an interval between the two left and right branch circuits 45L, 45R constituting the differential pair is realized as compared to the case where the locking lances 13 are arranged between the row of the terminal accommodation chambers 11 on the left side and the row of the terminal accommodation chambers 11 on the right side. Only one partition wall portion directly partitioning between the terminal accommodation chambers 11 is present between the terminal accommodation chambers 11 on the left side and the terminal accommodation chambers 11 on the right side.

In this embodiment, a width of the connection function portion 34 of the shorting member 30 is 0.64 mm. A width of the terminal body portion 41 of the terminal fitting 40 is 1.5 mm, and a height of the terminal body portion 41 is 2.0 mm. A distance between lateral centers of the terminal body portions 41 of the terminal fittings 40 inserted into the terminal accommodation chambers 11 on the left side and lateral centers of the terminal body portions 41 of the terminal fittings 40 inserted into the terminal accommodation chambers 11 on the right side is set to 2.2 mm. By this dimensioning, impedance of the differential pair in the housing 10 and impedance of the main line 51 and the branch line 52 outside the housing 10 were matched with high accuracy. If the distance between the lateral centers of the terminal body portions 41 on the left side and lateral centers of the terminal body portions 41 on the right side is in a range of 2.1 mm to 2.3 mm, the impedance of the differential pair in the housing 10 and the impedance of the main line 51 and the branch line 52 outside the housing 10 are matched in a satisfactory range.

In withdrawing the terminal fitting 40 in the terminal accommodation chamber 11, a jig (not shown) is inserted into the mold removal space 14 through the operation port 15 and the upper surface of the locking lance 13 is pushed by the tip of the jig to resiliently displace the locking lance 13 downward, whereby the locking lance 13 is disengaged from the locking portion 42. Since the retention of the terminal fitting 40 by the locking lance 13 is released in this way, the terminal fitting 40 may be pulled out rearward by gripping the main line 51 or branch line 52 with the locking lance 13 kept resiliently displaced. Since the operation port 15 is open over the entire surface, an operation of inserting the jig into the operation port 15 and an operation of resiliently displacing the locking lance 13 by the jig are easily performed.

The connector A of this embodiment includes the housing 10 made of synthetic resin, the two shorting members 30 made of metal and the three pairs (a plurality of pairs) of terminal fittings 40. The housing 10 includes the three pairs (a plurality of pairs) of terminal accommodation chambers 11 arranged in the vertical direction while being separated in two left and right rows. The two shorting members 30 are separately accommodated into the plurality of (three) terminal accommodation chambers 11 arranged in one row (on the left side) and the plurality of (three) terminal accommodation chambers 11 arranged in the other row (on the right side) and constitute the differential pair. The terminal fittings 40 are individually fixed to the main line 51 constituting the differential pair cable and the branch line 52 constituting the differential pair cable.

The terminal fittings 40 are connected to the shorting members 30 by being inserted into the terminal accommodation chambers 11. The terminal fittings 40 accommodated into the terminal accommodation chambers 11 on the left side and the terminal fittings 40 accommodated into the terminal accommodation chambers 11 on the right side constitute the differential pair. According to the configuration of the present disclosure, the branch circuit 45L composed of the shorting member 30 and the terminal fittings 40 accommodated in the plurality of terminal accommodation chambers 11 arranged in the one row and the branch circuit 45R composed of the shorting member 30 and the terminal fittings 40 accommodated in the plurality of terminal accommodation chambers 11 arranged in the other row constitute the differential pair.

The housing 10 is formed with the plurality of locking lances 13 for individually retaining the terminal fittings 40 inserted into the plurality of terminal accommodation chambers 11. If locking lances 13 are arranged laterally to terminal accommodation chambers 11 as in a housing 60 shown in FIG. 6, the terminal accommodation chambers 11 and the locking lances 13 are adjacent to each other in the lateral direction orthogonal to an arrangement direction of the terminal accommodation chambers 11 in each of left and right rows. In the case of such an arrangement, since the locking lances 30 are arranged between the plurality of terminal accommodation chambers 11 arranged in one row and the plurality of terminal accommodation chambers 11 arranged in another row, a lateral interval of a differential pair has to be large. Thus, even if an attempt is made to perform impedance matching by narrowing the interval of the differential pair, impedance matching is limited.

In contrast, in the connector A of this embodiment, all of the plurality of locking lances 13 are disposed only in regions different from the region between the plurality of (three) terminal accommodation chambers 11 arranged in the one row (on the left side) and the plurality of (three) terminal accommodation chambers 11 arranged in the other row (on the right side). Since none of the locking lances 13 is arranged between the plurality of terminal accommodation chambers 11 arranged in the one row and the plurality of terminal accommodation chambers 11 arranged in the other row, the interval of the differential pair in the housing 10 can be sufficiently narrowed. Since a degree of freedom in design in setting the interval of the differential pair in the housing 10 is enhanced, impedance in the housing 10 and impedance of the main line 51 and the branch line 52 outside the housing 10 can be matched with high accuracy.

In each row of the terminal accommodation chambers 11, the plurality of terminal accommodation chambers 11 and the plurality of locking lances 13 are alternately arranged. According to this configuration, the locking lances 13 (spaces for forming the locking lances 13) are contained in the row of the terminal accommodation chambers 11 in a width direction. Therefore, the housing 10 can be reduced in size in the arrangement direction (width direction) of the shorting members 30. The arrangement direction of the shorting members 30 is the lateral direction orthogonal to the arrangement direction of the terminal accommodation chambers 11 in each row.

The connection ports 12 communicating with the terminal accommodation chambers 11 and the operation ports 15 enabling the locking lances 13 from being disengaged from the terminal fittings 40 are alternately open in the vertical direction in the front surface 10F of the housing 10. The shorting member 30 includes the plurality of connecting portions 32 and the coupling portion 31. The plurality of connecting portions 32 are individually connected to the terminal fittings 40 by being inserted into the terminal accommodation chambers 11 through the connection ports 12. The coupling portion 31 couples the plurality of connecting portions 32 to each other. The coupling portion 31 is arranged at a position different from the operation ports 15, i.e. at a position deviated to either left or right with respect to the operation ports 15 in a front view of the housing 10. According to this configuration, even if the connection ports 12 of the terminal accommodation chambers 11 and the operation ports 15 used to operate the locking lances 13 are arranged in a row, the coupling portion 31 does not obstruct an operation when the jig is inserted into the operation port 15 to displace the locking lance 13.

The shorting member 30 is formed with the reinforcing portions 35 for reinforcing the connection function portions 34 of the connecting portions 32. The reinforcing portions 35 are formed by extending the connecting portions 32 forward and in the form of ribs projecting from the coupling portion 31. According to this configuration, the deformation of the connecting portions 32 can be prevented by the reinforcing portions 35.

The coupling portions 31 of the two shorting members 30 are arranged to sandwich the terminal accommodation chambers 11 from left and right sides in a front view. Since no coupling portion 31 is arranged between the terminal accommodation chambers 11 in the one row and those in the other row, the branch circuits 45L, 45R constituting the differential pair in the housing 10 can be sufficiently brought closer. Since a degree of freedom in design in setting the interval of the differential pair in the housing 10 is enhanced, the impedance in the housing 10 and the impedance of the main line 51 and the branch line 52 outside the housing 10 can be matched with high accuracy.

The distance between the terminal fittings 40 inserted into the terminal accommodation chambers 11 arranged in the one row and the terminal fittings 40 inserted into the terminal accommodation chambers 11 arranged in the other row is 2.1 mm to 2.3 mm. According to this configuration, the impedance in the housing 10 and the impedance of the main line 51 and the branch line 52 outside the housing 10 can be matched with high accuracy.

Second Embodiment

Figure 8:
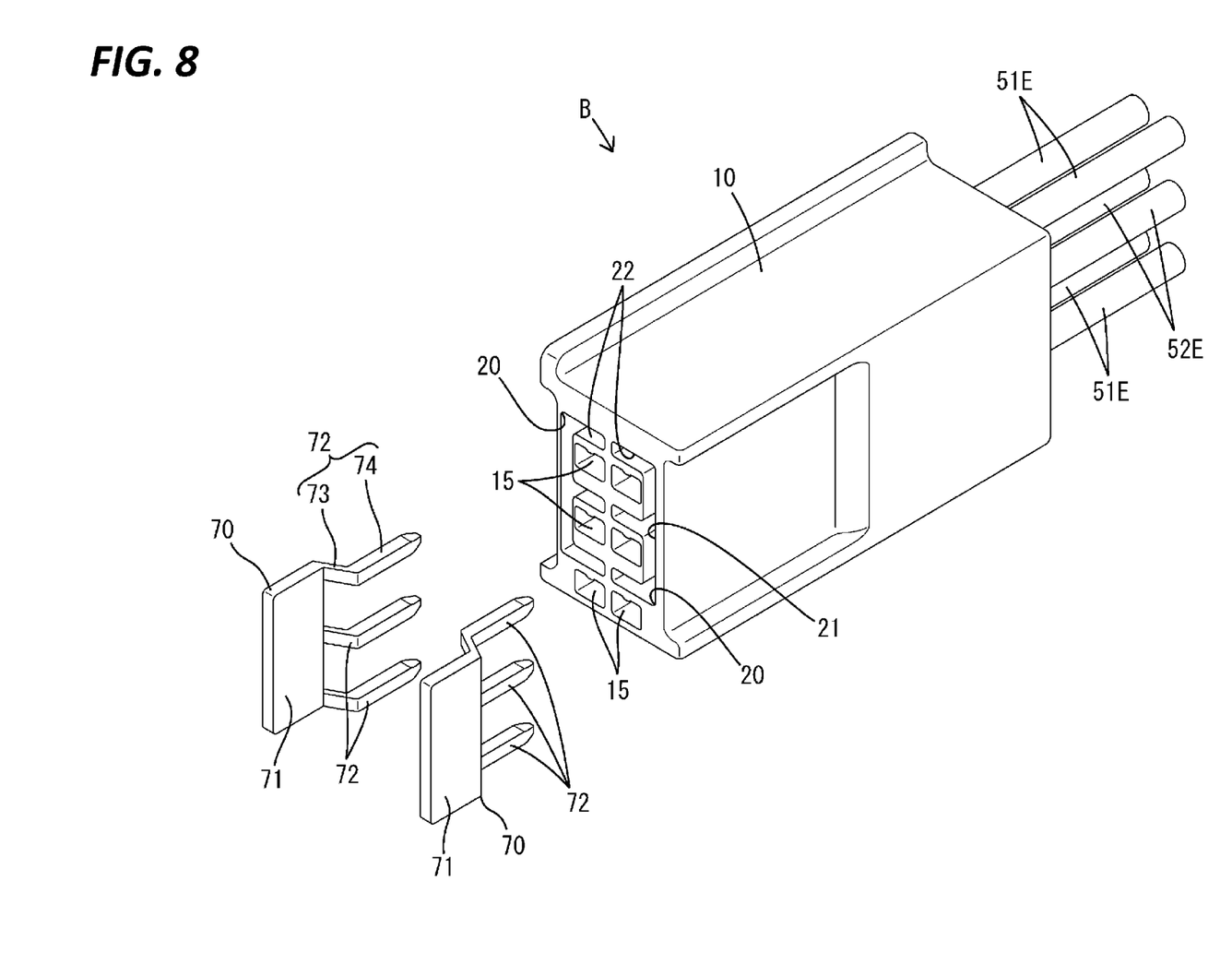
FIG. 8 is an exploded perspective view of a connector of a second embodiment.

A second specific embodiment of a connector B of the present disclosure is described with reference to FIG. 8. The connector of the second embodiment differs from the first embodiment in the configuration of shorting members 70. Since the other configuration is the same as in the first embodiment, the same components are denoted by the same reference signs and the structures, functions and effects thereof are not described.

The shorting member 70 is a single component made of an electrically conductive material such as metal. The shorting member 70 includes one coupling portion 71 and three connecting portions 72. The shorting member 70 of this embodiment does not include the reinforcing portions 35 formed in the shorting member 30 of the first embodiment. The coupling portion 71 is in the form of a flat plate having a plate thickness direction oriented in the lateral direction. The coupling portion 71 has a vertically long rectangular shape in a side view of a housing 10. A vertical dimension (height) of the coupling portion 71 is equal to a vertical dimension of a communication recess 21 of the housing 10. A lateral dimension (thickness) of the coupling portion 71 is equal to a lateral dimension (width) of the communication recess 21.

The three connecting portions 72 are connected to the rear end edge of the coupling portion 71 at an uppermost end part, a lowermost end part and a vertically central part. The three connecting portions 72 arranged vertically in parallel are electrically conductively coupled to each other via the coupling portion 71. The connecting portion 72 includes a separation linking portion 73 projecting from the rear end edge of the coupling portion 71 and a connection function portion 74 cantilevered rearward from the projecting end of the separation linking portion 73. The separation linking portions 73 of the shorting member 70 to be mounted into a left accommodation recess 20 project obliquely to a right front side from the rear end edge of the coupling portion 71. The separation linking portions 73 of the shorting member 70 to be mounted into a right accommodation recess 20 project obliquely to a left front side from the rear end edge of the coupling portion 71.

A vertical dimension of the separation linking portion 73 is equal to that of a branch recess 22. A projecting dimension in the lateral direction of the separation linking portion 73 is equal to a length in the lateral direction of the branch recess 22. A vertical direction of the connection function portion 74 is equal to that of a connection port 12 (not shown in FIG. 8). A lateral dimension of the connection function portion 74 is equal to that of the connection port 12. In a front view, the coupling portion 71 and three connection function portions 74 arranged vertically in parallel are arranged at such positions as to be separated in the lateral direction. The shorting member 70 to be mounted into the left accommodation recess 20 is shaped such that the coupling portion 71 is arranged to the left of the connection function portions 74. The shorting member 70 to be mounted into the right accommodation recess 20 is shaped such that the coupling portion 71 is arranged to the right of the connection function portions 74.

Other Embodiments

The present invention is not limited to the above described and illustrated embodiments and is represented by claims. The present invention is intended to include all changes in the scope of claims and in the meaning and scope of equivalents and also include the following embodiments.

Although the locking lances and the terminal accommodation chambers are alternately arranged in the above embodiments, the locking lances may be arranged in a region different from the row of the terminal accommodation chambers.

Although the coupling portion is arranged at the position deviated from the operation ports in a front view in the above embodiments, a part of the coupling portion may be arranged to overlap the operation port(s).

Although one branch line is branched from one branching portion of the main line in the above embodiments, a plurality of branch lines may be branched from one branching portion. In this case, if N denotes the number of the branch lines branched from the one branching portion, the number of the terminal accommodation chambers formed in the housing may be set to 2×(2+N).

Although the distance between the terminal fittings inserted into the terminal accommodation chambers arranged in the one row and the terminal fittings inserted into the terminal accommodation chambers arranged in the other row is set to 2.1 mm to 2.3 mm in the above embodiments, this distance between the terminal fittings may be shorter than 2.1 mm or longer than 2.3 mm.

LIST OF REFERENCE NUMERALS

A . . . connector
B . . . connector
10 . . . housing
10F . . . front surface of housing
11 . . . terminal accommodation chamber
12 . . . connection port
13 . . . locking lance
14 . . . mold removal space
15 . . . operation port
20 . . . accommodation recess
21 . . . communication recess
22 . . . branch recess
30 . . . shorting member
31 . . . coupling portion
32 . . . connecting portion
33 . . . separation linking portion
34 . . . connection function portion
35 . . . reinforcing portion
40 . . . terminal fitting
41 . . . terminal body portion
42 . . . locking portion
43 . . . crimping portion
45L . . . branch circuit
45R . . . branch circuit
50 . . . high-speed communication circuit
51 . . . main line
51E . . . connecting end part of main line
52 . . . branch line
52E . . . base end part of branch line
60 . . . housing
70 . . . shorting member
71 . . . coupling portion
72 . . . connecting portion
73 . . . separation linking portion
74 . . . connection function portion

What is claimed is:

1. A connector, comprising:
a housing including terminal accommodation chambers arranged in two rows;
two shorting members to be mounted into a plurality of the terminal accommodation chambers arranged in one row and a plurality of the terminal accommodation chambers arranged in the other row, the two shorting members constituting a differential pair;
a plurality of terminal fittings to be individually fixed to a main line constituting a differential pair and a branch line constituting a differential pair, the plurality of terminal fittings being connected to the shorting members by being inserted into the terminal accommodation chambers; and
a plurality of locking lances formed in the housing, the plurality of locking lances retaining the terminal fittings inserted into the terminal accommodation chambers,
the locking lances being disposed only in regions different from a region between the plurality of terminal accommodation chambers arranged in the one row and the plurality of terminal accommodation chambers arranged in the other row.

2. The connector of claim 1, wherein a distance between the terminal fittings inserted into the terminal accommodation chambers arranged in the one row and the terminal fittings inserted into the terminal accommodation chambers arranged in the other row is 2.1 mm to 2.3 mm.

3. The connector of claim 2, wherein the distance between the terminal fittings inserted into the terminal accommodation chambers arranged in the one row and the terminal fittings inserted into the terminal accommodation chambers arranged in the other row is 2.2 mm.

4. The connector of claim 1, wherein a plurality of the terminal accommodation chambers and a plurality of the locking lances are alternately arranged in each row of the terminal accommodation chambers.

5. The connector of claim 4, wherein:
connection ports communicating with the terminal accommodation chambers and operation ports enabling the locking lances to be disengaged from the terminal fittings are alternately open in a front surface of the housing,
the shorting member includes a plurality of connecting portions to be connected to the terminal fittings by being inserted into the terminal accommodation chambers through the connection ports and a coupling portion coupling the plurality of connecting portions to each other, and
the coupling portion is arranged at a position different from the operation ports in a front view of the housing.

6. The connector of claim 5, wherein the shorting member is formed with reinforcing portions in the form of ribs projecting from the coupling portion by extending the connecting portions.

7. The connector of claim 5, wherein the coupling portions of the two shorting members are arranged to sandwich the terminal accommodation chambers in a front view.

* * * * *